United States Patent
Zhang

(10) Patent No.: US 9,479,296 B2
(45) Date of Patent: Oct. 25, 2016

(54) METHOD AND DEVICE FOR HYBRID AUTOMATIC REPEAT REQUEST OF DYNAMIC FRAME STRUCTURE

(75) Inventor: Xiaobo Zhang, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 121 days.

(21) Appl. No.: 14/380,125

(22) PCT Filed: Jun. 28, 2012

(86) PCT No.: PCT/CN2012/077756
§ 371 (c)(1),
(2), (4) Date: Aug. 21, 2014

(87) PCT Pub. No.: WO2013/123751
PCT Pub. Date: Aug. 29, 2013

(65) Prior Publication Data
US 2015/0036559 A1 Feb. 5, 2015

(30) Foreign Application Priority Data
Feb. 24, 2012 (CN) .......................... 2012 1 0044207

(51) Int. Cl.
*H04L 1/18* (2006.01)
*H04L 5/00* (2006.01)
(Continued)

(52) U.S. Cl.
CPC ........... *H04L 1/1864* (2013.01); *H04L 1/1854* (2013.01); *H04L 1/1896* (2013.01); *H04L 5/0092* (2013.01); *H04L 5/14* (2013.01); *H04W 72/042* (2013.01)

(58) Field of Classification Search
CPC .................................................. H04L 1/1864
See application file for complete search history.

(56) References Cited

U.S. PATENT DOCUMENTS

2008/0232495 A1 9/2008 Yu
2012/0281654 A1* 11/2012 Aiba ..................... H04L 5/0007
370/329
(Continued)

FOREIGN PATENT DOCUMENTS

CN 102104469 A 6/2011
CN 102215096 A 10/2011
(Continued)

OTHER PUBLICATIONS

Discussion on HARQ timing with dynamic TDD UL-DL configuration, published on Feb. 1, 2012.
(Continued)

*Primary Examiner* — John Blanton
(74) *Attorney, Agent, or Firm* — Oppedahl Patent Law Firm LLC

(57) ABSTRACT

The present disclosure discloses method for Hybrid Automatic Repeat Request (HARQ) of a dynamic frame structure, including: determining, by a system device, that a predefined sub-frame of a current frame contains Downlink Control Information (DCI) indicating a frame structure; in all Time Division Duplexing (TDD) LTE frame structures, selecting a corresponding HARQ timing for each data sub-frame between the predefined sub-frame of the current frame and the predefined sub-frame of a next frame; and receiving or sending a HARQ feedback according to the selected HARQ timing. The present disclosure also discloses a HARQ device of a dynamic frame structure. Through the solution of the present disclosure, during switching the dynamic frame structure of a TDD LTE system, a corresponding HARQ timing can be selected for each data sub-frame in each frame, thus increasing A/N resolution and real-time performance, ensuring a quantity of a HARQ process, and reducing transmission delay and blocking rate.

12 Claims, 3 Drawing Sheets

101: after a system device determines that a predefined sub-frame of a current frame contains DCI indicating a frame structure, selecting, in all TDD frame structures, a corresponding HARQ timing for each data sub-frame between the predefined sub-frame of the current frame and the predefined sub-frame of a next frame

↓

102: the system device receives or sends a HARQ feedback in a corresponding data sub-frame according to the selected HARQ timing

(51) Int. Cl.
  *H04L 5/14*  (2006.01)
  *H04W 72/04* (2009.01)

(56) References Cited

U.S. PATENT DOCUMENTS

2013/0010706 A1* 1/2013 Kela ............... H04W 52/146
                                                    370/329
2013/0044651 A1* 2/2013 Wang ............... H04W 72/0406
                                                    370/280

FOREIGN PATENT DOCUMENTS

| CN | 102223214 A | 10/2011 |
| CN | 103249153 A | 8/2013 |
| EP | 1973262 A2 | 9/2008 |

OTHER PUBLICATIONS

Search space of enhanced downlink control channel, published on Jan. 31, 2012.

Supplementary European Search Report in European application No. 12869080.7, mailed on Mar. 19, 2015.

3GPP TSG-RAN WG1 Meeting #60bis, "Backhaul UL Subframe Allocation in TDD LTE-A Relay", R1-101825, Beijing, China, Apr. 12-16, 2010. (6 pages—see International Search Report in international application No. PCT/CN2012/077756 for relevant page numbers).

International Search Report in international application No. PCT/CN2012/077756, mailed on Dec. 6, 2012. (2 pages).

English Translation of the Written Opinion of the International Search Authority in international application No. PCT/CN2012/077756, mailed on Dec. 6, 2012. (8 pages).

* cited by examiner

METHOD AND DEVICE FOR HYBRID AUTOMATIC REPEAT REQUEST OF DYNAMIC FRAME STRUCTURE

TECHNICAL FIELD

The present disclosure relates to a dynamic frame structure technique of a communication system, and particularly relates to a method and a device for a Hybrid Automatic Repeat Request (HARQ) of a dynamic frame structure.

BACKGROUND

In a Long Term Evolution (LTE) standard and a Long Term Evolution-Advanced (LTE-A) standard, a system frame of Time Division Duplexing (TDD) LTE is composed of ten sub-frames. A $3^{rd}$ Generation Partnership Project (3GPP) supports seven kinds of frame structures in total, as shown in FIG. 1, wherein D represents a downlink channel sub-frame, S represents a shared channel sub-frame, and U represents an uplink channel sub-frame.

| Uplink and downlink frame structure number | Switching point period from downlink to uplink | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Currently, in a 3GPP standard, a User Equipment (UE) is informed of the frame structure configured for a current serving cell via a system information block (SIB-I). In a pre-research project of "a dynamic TDD frame structure" formally approved by a RAN54th (December, 2011) plenary meeting of the 3GPP, dynamically allocating the frame structure of a TDD LTE system becomes more possible. However, a minimum varying period of SIB information according to an existing 3GPP standard is 640 ms, and the frame structure of the TDD LTE system cannot be dynamically allocated in time. How to shorten the varying period of the frame structure of the TDD LTE system, and to more dynamically inform R11 and a subsequent version of UE of the frame structure employed by a next configuration period in a condition that 3GPP R8~R10 is compatible, does not have a corresponding solution currently.

In an invention patent of which the application number is 201210030111.8, disclosed is a method for notifying the UE of the frame structure employed by the next configuration period by using a Radio Resource Control (RRC) protocol+a Physical Downlink Control Channel (PDCCH). Wherein, configuration information of the frame structure is set by an evolved Node B (eNB) in a Downlink Control Information (DCI) bit of a PDCCH sub-frame. However, during the switch of this dynamic frame structure, how to make a HARQ process of a data sub-frame be compatible with an existing HARQ timing is a problem to be solved.

In a 3GPP proposal R1-20782/20070, a HARQ method being compatible with the existing HARQ timing is given, namely: the HARQ timing of a Physical Downlink Shared Channel (PDSCH) complies with the frame structure having a maximum downlink frame proportion in candidate frame structures, and a scheduling timing of the PUSCH and the HARQ timing of the PUSCH comply with the frame structure having a maximum uplink frame proportion in the candidate frame structures.

Although the proposal R1-20782/20070 can be compatible with the existing HARQ timing, but a quantity of a HARQ process is reduced, bringing a higher transmission time delay and blocking rate, for example, when an actual frame structure 4 is adopted, while an uplink ACK/NACK (A/N) is fed back in accordance with a default frame structure 5, then the HARQ process is reduced by one time; an A/N resolution is also reduced, bringing greater performance loss, for example, when an actual frame structure 3 is adopted, while the uplink A/N is fed back in accordance with the default frame structure 5, then A/N multiplexing cannot be employed, and only an A/N bonding strategy can be employed; and unnecessary power loss is brought, for example with regards to an actual frame structure 0 and the default frame structure 5, in the actual uplink sub-frame, the UE needs to observe a downlink channel, bringing a possibility of a DCI false-alarm.

SUMMARY

In view of this, the present disclosure provides a method and a device for Hybrid Automatic Repeat Request (HARQ) of a dynamic frame structure, which can select a corresponding HARQ timing for each data sub-frame in each frame during switching the dynamic frame structure of a TDD LTE system, and improve A/N resolution and real-time performance.

Therefore, a technical solution of the present disclosure is implemented as follows:

The present disclosure discloses method for Hybrid Automatic Repeat Request (HARQ) of a dynamic frame structure, including:

determining, by a system device, that a predefined sub-frame of a current frame contains Downlink Control Information (DCI) indicating a frame structure; in all Time Division Duplexing (TDD) LTE frame structures, selecting a corresponding HARQ timing for each data sub-frame between the predefined sub-frame of the current frame and the predefined sub-frame of a next frame; and receiving or sending a HARQ feedback according to the selected HARQ timing.

In the above technical solution, the step of selecting the corresponding HARQ timing for each data sub-frame between the predefined sub-frame of the current frame and the predefined sub-frame of the next frame may comprise:

for each data sub-frame between the predefined sub-frame of the current frame and the predefined sub-frame of the next frame:

when an evolved Node B (eNB) sends data in a downlink data sub-frame, searching, in a TDD LTE frame structure table, downlink data sub-frames having the same number as that of the downlink data sub-frame sending the data from all frame structures, selecting, in the searched downlink data sub-frames, the downlink data sub-frame having a maximum control channel resolution of a HARQ timing, and taking a HARQ timing of a frame structure in which the selected downlink data sub-frame is located as the HARQ timing of the downlink data sub-frame being currently sending the data; and when the eNB receives the data in an uplink data sub-frame, searching, in the TDD LTE frame structure table, uplink data sub-frames having the same number as that of the uplink data sub-frame receiving the data from all frame structures, selecting, in the searched uplink data sub-frames, the uplink data sub-frame having the maximum control channel resolution of the HARQ timing, taking the HARQ timing of the frame structure in which the selected uplink data sub-frame is located as the HARQ timing of the uplink data sub-frame currently receiving the data.

In the above technical solution, the step of selecting the corresponding HARQ timing for each data sub-frame between the predefined sub-frame of the current frame and the predefined sub-frame of the next frame may include:

for each data sub-frame between the predefined sub-frame of the current frame and the predefined sub-frame of the next frame:

when a User Equipment (UE) sends data in an uplink data sub-frame, searching, in a TDD LTE frame structure table, uplink data sub-frames having the same number as that of the uplink data sub-frame sending the data from all frame structures, selecting, in the searched uplink data sub-frame, the uplink data sub-frame having a maximum control channel resolution of the HARQ timing, taking the HARQ timing of the frame structure in which the selected uplink data sub-frame is located as the HARQ timing of the uplink data sub-frame currently sending the data; and when the UE receives the data in a downlink data sub-frame, searching, in the TDD LTE frame structure table, downlink data sub-frames having the same number as that of the downlink data sub-frame receiving the data from all frame structures, selecting, in the searched downlink data sub-frame, the downlink data sub-frame having the maximum control channel resolution of the HARQ timing, taking the HARQ timing of the frame structure in which the selected downlink data sub-frame is located as the HARQ timing of the downlink data sub-frame currently receiving the data.

In the above technical solution, this method may further include: when a quantity of the downlink data sub-frame having the maximum control channel resolution of the HARQ timing is at least two, selecting, therefrom, the downlink data sub-frame having the highest real-time performance.

In the above technical solution, this method may further include: when a quantity of the uplink data sub-frame having the maximum control channel resolution of the HARQ timing is at least two, selecting, therefrom, the uplink data sub-frame having the highest real-time performance.

In the above technical solution, the step of selecting the corresponding HARQ timing for each data sub-frame between the predefined sub-frame of the current frame and the predefined sub-frame of the next frame from all the TDD LTE frame structures may include:

when the DCI indicating the frame structure is DCI 0/4 and the predefined sub-frame is a fifth sub-frame, if both the frame structures of the current frame and the next frame indicated by the DCI 0/4 are 0, then with regard to the HARQ timing of each data sub-frame between the predefined sub-frame of the current frame and the predefined sub-frame of the next frame, selecting, by the eNB and/or the UE, the HARQ timing of a corresponding data sub-frame in the frame structure 0; if at least one of the frame structures of the current frame and the next frame indicated by the DCI 0/4 are not 0, then with regard to the HARQ timing of each data sub-frame between the predefined sub-frame of the current frame and the predefined sub-frame of the next frame, selecting, by the eNB and/or the UE, the HARQ timing of the corresponding data sub-frame in a frame structure 6.

In the above technical solution, the step of selecting the corresponding HARQ timing for each data sub-frame between the predefined sub-frame of the current frame and the predefined sub-frame of the next frame from all the TDD LTE frame structures may include:

when the DCI indicating the frame structure is DCI 0/4 and the predefined sub-frame is an eighth sub-frame, with regard to the HARQ timing of each data sub-frame between the predefined sub-frame of the current frame and the predefined sub-frame of the next frame, selecting, by the eNB and/or the UE, the HARQ timing of a corresponding data sub-frame in a frame structure 3.

In the above technical solution, the predefined sub-frame employs the DCI of a Semi-Persistent Scheduling-Cell Radio Network Temporary Identifier (SPS C-RNTI) to indicate the frame structure of the next frame.

In the above technical solution, the DCI of the SPS C-RNTI is used to indicating, one time, the frame structure of the next frame.

In the above technical solution, the DCI of the SPS C-RNTI is used to indicating, semi-statically, the frame structure of the next frame.

In the above technical solution, this method may further include: after the UE reads frame structure configuration information from Reuse Uplink Index (ULI) or Downlink Assignment Index (DAI) bit information in the DCI 0/4 of the predefined sub-frame, not sending the HARQ feedback in a corresponding Physical Uplink Shared Channel (PUSCH).

The present disclosure discloses device for Hybrid Automatic Repeat Request (HARQ) of a dynamic frame structure, including: a dynamic frame structure determining module, a selecting module, and an executing module; wherein the dynamic frame structure determining module is configured to notify the selecting module after determining that a predefined sub-frame of a current frame contains Downlink Control Information (DCI) indicating a frame structure;

the selecting module, is configured to select, in all Time Division Duplexing (TDD) LTE frame structures, a corresponding HARQ timing for each data sub-frame between the predefined sub-frame of the current frame and the predefined sub-frame of a next frame; and the executing module is configured to receive or send a HARQ feedback according to the HARQ timing selected by the selecting module.

In the above technical solution, when this device is located in an evolved Node B (eNB), the dynamic frame structure determining module is configured to notify the selecting module after the predefined sub-frame of the current frame sends the DCI indicating the frame structure;

the selecting module is configured to, when sending data in a downlink data sub-frame between the predefined sub-frame of the current frame and the predefined sub-frame of the next frame, search, in a TDD LTE frame structure table, downlink data sub-frames having the same number as that of the downlink data sub-frame sending the data from all frame structures, select a downlink data sub-frame having a maximum control channel resolution of a HARQ timing from the searched downlink data sub-frame, and take the HARQ timing of the frame structure in which the selected downlink data sub-frame is located as the HARQ timing of the downlink data sub-frame currently sending the data;

when receiving data in an uplink data sub-frame between the predefine sub-frame of the current frame and the predefine sub-frame of the next frame, search, in the TDD LTE frame structure table, uplink data sub-frames having the same number as that of the uplink data sub-frame receiving the data from all frame structures, select, in the searched uplink data sub-frames, the uplink data sub-frame having the maximum control channel resolution of the HARQ timing, and take the HARQ timing of the frame structure in which the selected uplink data sub-frame is located as the HARQ timing of the uplink data sub-frame currently receiving the data.

In the above technical solution, when this device is located in a User Equipment (UE), the dynamic frame structure determining module, is configured to notify the selecting module after the predefined sub-frame of the current frame detects the DCI indicating the frame structure;

the selecting module is configured to, when sending data in the uplink data sub-frame between the predefined sub-frame of the current frame and the predefined sub-frame of the next frame, search, in the TDD LTE frame structure table, an uplink data sub-frame having the same number as that of the uplink data sub-frame sending the data from all the frame structures, select, in the searched uplink data sub-frames, the uplink data sub-frame having the maximum control channel resolution of the HARQ timing, and take the HARQ timing of the frame structure in which the selected uplink data sub-frame is located as the HARQ timing of the uplink data sub-frame currently sending the data; and when a downlink data sub-frame between the predefine sub-frame of the current frame and the predefine sub-frame of the next frame receives the data, search a downlink data sub-frame having the same number as that of the downlink data sub-frame receiving the data from all the frame structures in the TDD LTE frame structure table, select the downlink data sub-frame having the maximum control channel resolution of the HARQ timing from the searched downlink data sub-frame, take the HARQ timing of the frame structure in which the selected downlink data sub-frame is located as the HARQ timing of the downlink data sub-frame currently receiving the data.

In the HARQ method and device of the dynamic frame structure provided by the embodiment of the present disclosure, after the system device determines that the predefined sub-frame of the current frame contains the DCI indicating the frame structure, the HARQ timing corresponding to each data sub-frame between the predefined sub-frame of the current frame and the predefined sub-frame of the next frame is searched from all the TDD LTE frame structures; the HARQ feedback is received or sent according to the searched HARQ timing. In this way, during switching the dynamic frame structure of a TDD LTE system, a corresponding HARQ timing can be selected for each data sub-frame in each frame, thus increasing A/N resolution and real-time performance, ensuring a quantity of a HARQ process, and reducing transmission delay and blocking rate.

DETAILED DESCRIPTION

In an existing 3GPP standard, a TDD LTE frame structure will influence a system and data, wherein an influence to the system includes: influences to system information positioning, source positioning in Semi-persistent Scheduling (SPS), a Multicast Broadcast Single Frequency Network (MBSFN) sub-frame position, Physical Random Access Channel (PRACH) positioning; the influence to the data includes: influences to downlink detection, a timing, control channel source mapping, a quantity of a HARQ process.

After taking the influence to the system away, with regard to a UE of a 3GPP standard R11 version and a later version, configuration of the frame structure is specific to the UE, and each UE may be configured with multiple frame structures.

A basic idea of the present disclosure is: determining, by a system device, that a predefined sub-frame of a current frame contains Downlink Control Information (DCI) indicating a frame structure; selecting, in all Time Division Duplexing (TDD) LTE frame structures, a corresponding HARQ timing for each data sub-frame between the predefined sub-frame of the current frame and the predefined sub-frame of a next frame; and receiving or sending a HARQ feedback according to the selected HARQ timing.

The system device is the eNB and/or the UE.

The present disclosure is further described below in detail through the appended drawings and specific embodiments.

Figure 1:
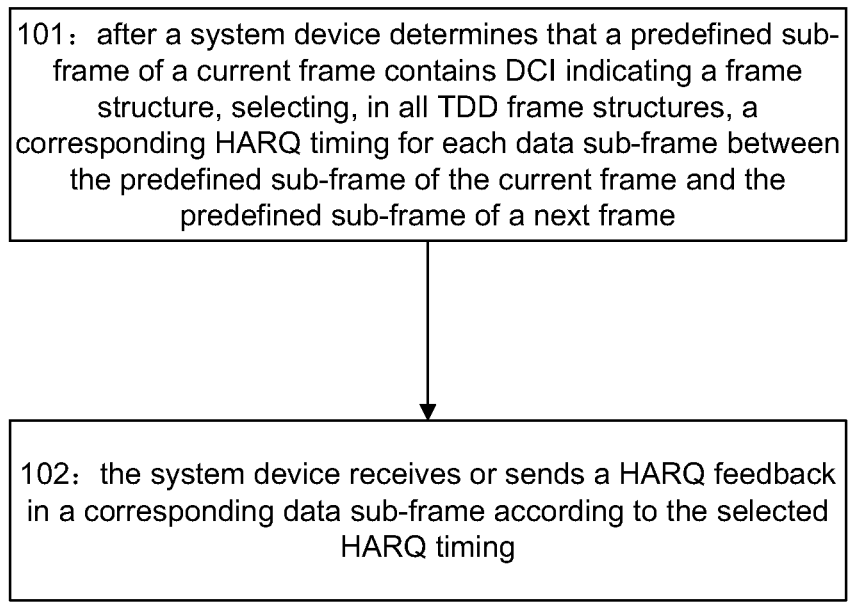
FIG. 1 is a flowchart showing a method for HARQ of a dynamic frame structure implemented by an embodiment of the present disclosure.

A HARQ method of the dynamic frame structure is implemented by an embodiment of the present disclosure, as shown in FIG. 1, this method includes the following steps:

Step 101: after a system device determines that a predefined sub-frame of a current frame contains DCI indicating the frame structure, selecting, from all TDD LTE frame structures, a corresponding HARQ timing for each data sub-frame between the predefined sub-frame of the current frame and the predefined sub-frame of a next frame;

Specially, in the TDD LTE system, after the eNB sends the DCI indicating the frame structure in the predefined sub-frame of the current frame, for each data frame between the predefined sub-frame of the current frame and the predefined sub-frame of the next frame:

when an evolved Node B (eNB) sends data in a downlink data sub-frame, an eNB searches, in a TDD LTE frame structure table, downlink data sub-frames having a same number as that of the downlink data sub-frame sending the data from all frame structures, selects, in the searched downlink data sub-frames, the downlink data sub-frames having a maximum control channel resolution of a HARQ timing, takes a HARQ timing of a frame structure in which the selected downlink data sub-frame is located as the HARQ timing of the downlink data sub-frame being currently sending the data; and when the eNB receives the data in an uplink data sub-frame, the eNB searches, in the TDD LTE frame structure table, uplink data sub-frames having the same number as that of the uplink data sub-frame receiving the data from all the frame structures, selects from the searched uplink data sub-frames, the uplink data sub-frame having the maximum control channel resolution of the HARQ timing, and takes the HARQ timing of the frame structure in which the selected uplink data sub-frame is located as the HARQ timing of the uplink data sub-frame currently receiving the data.

In the TDD LTE system, after the UE detects the DCI indicating the frame structure in the predefined sub-frame of the current frame, for each data sub-frame between the predefined sub-frame of the current frame and the predefined sub-frame of the next frame:

when a User Equipment (UE) sends data in an uplink data sub-frame, the UE searches, in a TDD LTE frame structure table, uplink data sub-frames having a same number as that of the uplink data sub-frame sending the data from all frame structures, selects, in the searched uplink data sub-frames, the uplink data sub-frame having a maximum control channel resolution of the HARQ timing, and takes the HARQ timing of the frame structure in which the selected uplink data sub-frame is located as the HARQ timing of the uplink data sub-frame currently sending the data; and when the UE receives the data in a downlink data sub-frame, the UE searches, in the TDD LTE frame structure table, downlink data sub-frames having the same number as that of the downlink data sub-frame receiving the data from all the frame structures, selects, in the searched downlink data sub-frame, the downlink data sub-frame having the maximum control channel resolution of the HARQ timing, and takes the HARQ timing of the frame structure in which the selected downlink data sub-frame is located as the HARQ timing of the downlink data sub-frame currently receiving the data.

Preferably, when a quantity of the downlink data sub-frame having the maximum control channel resolution of the HARQ timing is at least two, the downlink data sub-frame having the highest real-time performance is selected therefrom.

Preferably, when a quantity of the uplink data sub-frame having the maximum control channel resolution of the HARQ timing is at least two, the uplink data sub-frame having the highest real-time performance is selected therefrom.

When the DCI indicating the frame structure is DCI 0/4, this step may also be:

when the predefined sub-frame is a fifth sub-frame, if both the frame structures of the current frame and the next frame indicated by the DCI 0/4 are 0, then with regard to the HARQ timing of each data sub-frame between the predefined sub-frame of the current frame and the predefined sub-frame of the next frame, the eNB and/or the UE selects the HARQ timing of a corresponding data sub-frame in the frame structure 0; if at least one of the frame structures of the current frame and the next frame indicated by the DCI 0/4 are not 0, then with regard to the HARQ timing of each data sub-frame between the predefined sub-frame of the current frame and the predefined sub-frame of the next frame, the eNB and/or the UE selects the HARQ timing of the corresponding data sub-frame in a frame structure 6.

when the predefined sub-frame is an eighth sub-frame, with regard to the HARQ timing of each data sub-frame between the predefined sub-frame of the current frame and the predefined sub-frame of the next frame, the eNB and/or the UE selects the HARQ timing of a corresponding data sub-frame in a frame structure 3.

This step may also include: regardless of frame structure configuration of a current System Information Block 1 (SIB-I), after reading frame structure configuration information from Reuse Uplink Index (ULI) or Downlink Assignment Index (DAI) bit information in the DCI 0/4 of the predefined sub-frame, the UE does not send the HARQ feedback in a Physical Uplink Shared Channel (PUSCH) of a next frame, namely the second frame, such as A/N. If an uplink feedback of the current UE does not receive an indication of the DCI 0/4, then the HARQ feedback is sent in the PUCCH in accordance with the related art.

This step further includes: when the system device determines that the predefined sub-frame of the current frame does not contain the DCI indicating the frame structure, with regard to the HARQ timing of each data sub-frame between the predefined sub-frame of the current frame and the predefined sub-frame of the next frame, the system device selects the HARQ timing of the corresponding data sub-frame in a SIB-I frame structure of the 3GPP standard R10 version, or selects the HARQ timing of the corresponding data sub-frame in the frame structure indicated by the DCI 0/4 in the predefined sub-frame received in a most recent time.

In this step, a scramble employed by the DCI may be a Cell Radio Network Temporary Identifier (C-RNTI) or a Semi-Persistent Scheduling-Cell Radio Network Temporary Identifier (SPS C-RNTI). When the SPS-RNTI is used, the DCI of the SPS C-RNTI is used to indicating, one time, the frame structure of the next frame, namely the UE is scheduled only once; or the DCI of the SPS C-RNTI is used to indicating, semi-statically, the frame structure of the next frame, namely the UE is semi-statically scheduled.

This step further includes: when switching inside a frame structure 0/1/2/6 and a frame structure 3/4/5 separately, with regards to the HARQ timing of the PDSCH, the system device selects the HARQ timing of PDSCH in the frame structure having the maximum downlink frame proportion in a system information block1 and a system information block 2; with regards to a scheduling timing of the PUSCH and the HARQ timing of the PUSCH, the system device selects the scheduling timing of PUSCH and the HARQ timing of PUSCH in the frame structure having the maximum uplink frame proportion in the system information block1 and the system information block 2.

Here, when the system defines a new frame structure, for example the newly defined frame structure is DSUDDDDSUDD, all the frame structures, besides including an existing 7 kinds of frame structures, also includes the newly defined frame structure.

Step 102: the system device receives or sends a HARQ feedback in the corresponding data sub-frame according to the selected HARQ timing A difference between the present disclosure and the related art is explained below through the embodiments of FIGS. 2 and 3.

Figure 2:
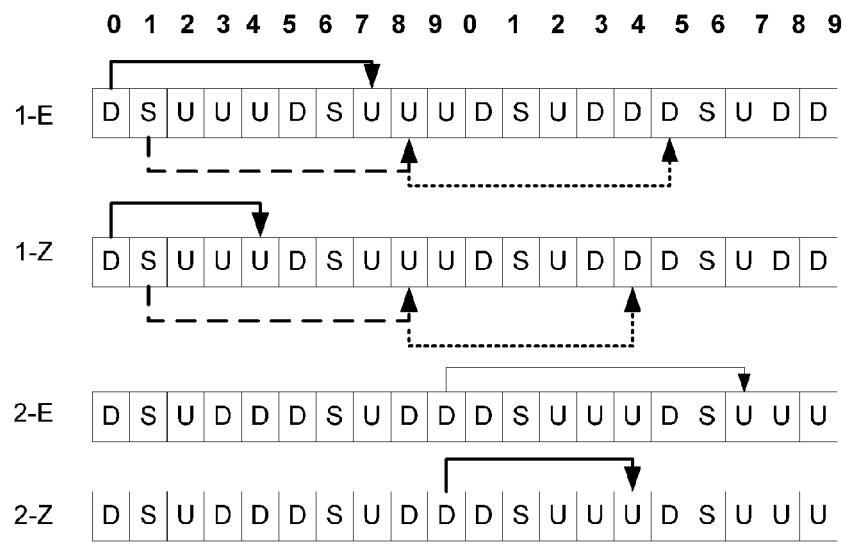
FIG. 2 is a schematic view showing a HARQ timing selected during switching between a frame structure 0 and a frame structure 2 according to an embodiment of the present disclosure and the related art.

As shown in FIG. 2, the HARQ timing of the PDSCH is represented by a solid line arrow, the scheduling timing of the PUSCH is represented by a thin dash line arrow, and the HARQ timing of the PUSCH is represented by a thick dash line arrow.

1-E represents the HARQ timing when switching from a frame structure 0 to a frame structure 2 in the related art, wherein PDSCH data is sent in a data sub-frame 0, on the basis that the frame structure 2 is the frame structure having the maximum downlink frame proportion in a candidate frame structure, the HARQ feedback is received in a data sub-frame 7 in accordance with the HARQ timing of the data sub-frame 0 in the frame structure 2; PDCCH data is sent in a data sub-frame 1, the frame structure 0 is the frame structure having the maximum uplink frame proportion in the candidate frame structure, PUSCH data are fed back in a data sub-frame 8 in accordance with the HARQ timing of the data sub-frame 1 in the frame structure 0; after the data sub-frame 8 feeds back the PUSCH data, the frame structure 0 is the frame structure having the maximum uplink frame proportion in the candidate frame structure, Physical Hybrid Retransmission Indication Channel (PHICH) data is sent in a data sub-frame 5 of the next frame in accordance with the HARQ timing of the data sub-frame 8 in the frame structure 0.

1-Z represents the HARQ timing when switching from the frame structure 0 to the frame structure 2 in the embodiment of the present disclosure, wherein the predefined sub-frame is the data sub-frame 5, the HARQ timing of the PDSCH and the scheduling timing of the PUSCH before the data sub-frame 5 of the current frame are the same as the related art, the data sub-frame 8 fed back the PUSCH data is between the data sub-frame 5 and the data sub-frame 5 of the next frame, the data sub-frame 8 is searched from all frame structure in the TDD LTE frame structure table, the data sub-frame 8 of the frame structure 0, 1, and 6 is found to be the uplink data sub-frame, wherein, the data sub-frame 8 of the frame structure 1 has the maximum control channel resolution of the HARQ timing, PHICH data are sent in a data sub-frame 4 of the next frame in accordance with the HARQ timing of the data sub-frame 8 of the frame structure 1;

2-E represents the HARQ timing of the PDSCH when switching from the frame structure 2 to the frame structure 0 in the related art, wherein the PDSCH data are sent in a data sub-frame 9, on the basis that the frame structure 2 is the frame structure having the maximum downlink frame proportion in the candidate frame structure, the HARQ feedback is received in the data sub-frame 7 of the next frame in accordance with the HARQ timing of the data sub-frame 9 in the frame structure 2;

2-Z represents the HARQ timing of the PDSCH when switching from the frame structure 2 to the frame structure 0 in the embodiment of the present disclosure, wherein the predefined sub-frame is the data sub-frame 5, the PDSCH data are sent in the data sub-frame 9 of the current frame, the data sub-frame 9 is searched from all the frame structures in the TDD LTE frame structure table, the data sub-frame 9 of the frame structure 1, 2, 3, 4, 5, and 6 is the downlink data sub-frame, wherein the data sub-frame 9 of the frame structure 3 has the maximum control channel resolution of the HARQ timing, the HARQ feedback is received in the data sub-frame 4 of the next frame in accordance with the HARQ timing of the data sub-frame 9 of the frame structure 3.

Figure 3:
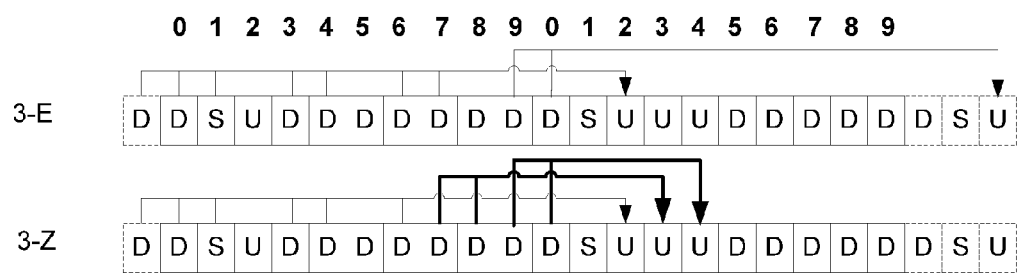
FIG. 3 is a schematic view showing a HARQ timing of the PDSCH during switching from a frame structure 5 to a frame structure 3 according to an embodiment of the present disclosure and the related art.

As shown in FIG. 3, 3-E represents the HARQ timing of the PDSCH when switching from the frame structure 5 to the frame structure 3 in the related art, wherein the PDSCH data are sent in the data sub-frame 0, 1, 3, 4, 5, 6, 7, 8, and 9 of the current frame and the data sub-frame 0 of the next frame, on the basis that the frame structure 5 is the frame structure having the maximum downlink frame proportion in the candidate frame structure, in accordance with the HARQ timing of the data sub-frame 0, 1, 3, 4, 5, 6, 7, 8, and 9 in the frame structure 5, the HARQ feedback the data sub-frame 0, 1, 3, 4, 5, 6, and 7 is received in the date sub-frame 2 of the next frame; the HARQ feedback of the data sub-frame 9 of the current frame and the data sub-frame 0 of the next frame is received in the data sub-frame 2 of a frame after the next frame;

3-Z represents the HARQ timing of the PDSCH when switching from the frame structure 5 to the frame structure 3 in the embodiment of the present disclosure, wherein the predefined sub-frame is data sub-frame 5, the PDSCH data are sent in the data sub-frame 0, 1, 3, 4, 5, 6, 7, 8, and 9 of the current frame and the data sub-frame 0 of the next frame; according to the method of Step 101, after the data sub-frame 0, 1, 3, 4, 5, and 6 of the current frame send the PDSCH data, in accordance with the HARQ timing of the data sub-frame 0, 1, 3, 4, 5, and 6 in the frame structure 5, the HARQ feedback is received in the data sub-frame 2 of the next frame; after the data sub-frame 7 and 8 send the PDSCH data, in accordance with the HARQ timing of the data sub-frame 7 and 8 in the frame structure 3, the HARQ feedback is received in the data sub-frame 3 of the next frame; after the data sub-frame 9 of the current frame and the data sub-frame 0 of the next frame send the PDSCH data, in accordance with the HARQ timing of the data sub-frame 0 and 9 in the frame structure 3, the HARQ feedback is received in the data sub-frame 4 of the next frame.

Figure 4:
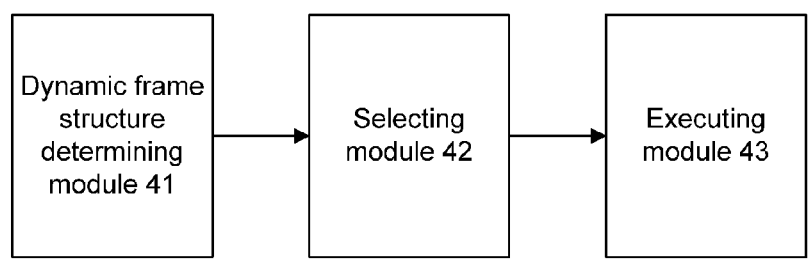
FIG. 4 is a structural view showing a HARQ device of a dynamic frame structure implemented by an embodiment of the present disclosure.

Based on the above method, an embodiment of the present disclosure also provides a device for HARQ of the dynamic frame structure, as shown in FIG. 4, this device includes: a dynamic frame structure determining module 41, a selecting module 42, and an executing module 43; wherein the dynamic frame structure determining module 41 is configured to notify the selecting module 42 after determining that a predefined sub-frame of a current frame contains DCI indicating a frame structure;

the selecting module 42, is configured to select a corresponding HARQ timing for each data sub-frame between the predefined sub-frame of the current frame and the predefined sub-frame of a next frame, from all TDD LTE frame structures; and the executing module 43, is configured to receive or send a HARQ feedback according to the HARQ timing selected by the selecting module 42;

when this device is located in an eNB, the dynamic frame structure determining module 41 is configured to notify the selecting module 42 after the predefined sub-frame of the current frame sends the DCI indicating the frame structure;

the selecting module 42 is configured to, when sending data in a downlink data sub-frame between the predefined sub-frame of the current frame and the predefined sub-frame of the next frame, search, in a TDD LTE frame structure table, downlink data sub-frames having the same number as that of the downlink data sub-frame sending the data from all frame structures, select, from the searched downlink data sub-frames, a downlink data sub-frame having a maximum control channel resolution of a HARQ timing, and take the HARQ timing of the frame structure in which the selected downlink data sub-frame is located as the HARQ timing of the downlink data sub-frame currently sending the data;

when receiving data in an uplink data sub-frame between the predefine sub-frame of the current frame and the predefine sub-frame of the next frame receives the data, search, in the TDD LTE frame structure table, uplink data sub-frames having the same number as that of the uplink data sub-frame receiving the data from all frame structures, select, in the searched uplink data sub-frames, an uplink data sub-frame having the maximum control channel resolution of the HARQ timing, and take the HARQ timing of the frame structure in which the selected uplink data sub-frame is located as the HARQ timing of the uplink data sub-frame currently receiving the data;

when this device is located in a UE, the dynamic frame structure determining module 41, is configured to notify the selecting module 42 after the predefined sub-frame of the current frame detects the DCI indicating the frame structure;

the selecting module 42 is configured to, when sending data in the uplink data sub-frame between the predefined sub-frame of the current frame and the predefined sub-frame of the next frame, search, in the TDD LTE frame structure table, uplink data sub-frames having the same number as that of the uplink data sub-frame sending the data from all the frame structures, select, in the searched uplink data sub-frames, the uplink data sub-frame having the maximum control channel resolution of the HARQ timing, and take the HARQ timing of the frame structure in which the selected uplink data sub-frame is located as the HARQ timing of the uplink data sub-frame currently sending the data;

when a downlink data sub-frame between the predefine sub-frame of the current frame and the predefine sub-frame of the next frame receives the data, search, in the TDD LTE frame structure table, downlink data sub-frames having the same number as that of the downlink data sub-frame receiving the data from all the frame structures, select, in the searched downlink data sub-frames, the downlink data sub-frame having the maximum control channel resolution of the HARQ timing, and take the HARQ timing of the frame structure in which the selected downlink data sub-frame is located as the HARQ timing of the downlink data sub-frame currently receiving the data;

preferably, when a quantity of the downlink data sub-frame having the maximum control channel resolution of the HARQ timing is more than one, selecting, therefrom, the downlink data sub-frame having a highest real-time performance; and preferably, when a quantity of the uplink data sub-frame having the maximum control channel resolution of the HARQ timing is more than one, selecting, therefrom, the uplink data sub-frame having a highest real-time performance.

All those described above are only preferred embodiment of the present disclosure, and are not intend to limit the protection scope of the present disclosure.

The invention claimed is:

1. A method for Hybrid Automatic Repeat Request (HARQ) of a dynamic frame structure, comprising:
   determining, by a system device, that a predefined sub-frame of a current frame contains Downlink Control Information (DCI) indicating a frame structure;
   selecting, in all Time Division Duplexing (TDD) LTE frame structures, a corresponding HARQ timing for each data sub-frame between the predefined sub-frame of the current frame and the predefined sub-frame of a next frame; and
   receiving or sending a HARQ feedback according to the selected HARQ timing;
   wherein the step of selecting the corresponding HARQ timing for each data sub-frame between the predefined sub-frame of the current frame and the predefined sub-frame of the next frame comprises:
   for each data sub-frame between the predefined sub-frame of the current frame and the predefined sub-frame of the next frame:
   when an evolved Node B (eNB) sends data in a downlink data sub-frame, searching, in a TDD LTE frame structure table, downlink data sub-frames having the same number as that of the downlink data sub-frame sending the data from all frame structures, selecting, in the searched downlink data sub-frames, the downlink data sub-frame having a maximum control channel resolution of a HARQ timing, and taking a HARQ timing of a frame structure in which the selected downlink data sub-frame is located as the HARQ timing of the downlink data sub-frame being currently sending the data; or
   when the eNB receives the data in an uplink data sub-frame, searching, in the TDD LTE frame structure table, uplink data sub-frames having the same number as that of the uplink data sub-frame receiving the data from all frame structures, selecting, in the searched uplink data sub-frames, the uplink data sub-frame having the maximum control channel resolution of the HARQ timing, taking the HARQ timing of the frame structure in which the selected uplink data sub-frame is located as the HARQ timing of the uplink data sub-frame currently receiving the data.

2. The method according to claim 1, wherein the step of selecting the corresponding HARQ timing for each data sub-frame between the predefined sub-frame of the current frame and the predefined sub-frame of the next frame comprises:
   for each data sub-frame between the predefined sub-frame of the current frame and the predefined sub-frame of the next frame:
   when a User Equipment (UE) sends data in an uplink data sub-frame, searching, in a TDD LTE frame structure table, uplink data sub-frames having the same number as that of the uplink data sub-frame sending the data from all frame structures, selecting, in the searched uplink data sub-frame, the uplink data sub-frame having a maximum control channel resolution of the HARQ timing, taking the HARQ timing of the frame structure in which the selected uplink data sub-frame is located as the HARQ timing of the uplink data sub-frame currently sending the data; or
   when the UE receives the data in a downlink data sub-frame, searching, in the TDD LTE frame structure table, downlink data sub-frames having the same number as that of the downlink data sub-frame receiving the data from all frame structures, selecting, in the searched downlink data sub-frame, the downlink data sub-frame having the maximum control channel resolution of the HARQ timing, taking the HARQ timing of the frame structure in which the selected downlink data sub-frame is located as the HARQ timing of the downlink data sub-frame currently receiving the data.

3. The method according to claim 2, further comprising: when a quantity of the downlink data sub-frame having the maximum control channel resolution of the HARQ timing is at least two, selecting, therefrom, the downlink data sub-frame having the highest real-time performance.

4. The method according to claim 2, further comprising: when a quantity of the uplink data sub-frame having the maximum control channel resolution of the HARQ timing is at least two, selecting, therefrom, the uplink data sub-frame having the highest real-time performance.

5. The method according to claim 1, wherein the step of selecting the corresponding HARQ timing for each data sub-frame between the predefined sub-frame of the current frame and the predefined sub-frame of the next frame comprises:
   when the DCI indicating the frame structure is DCI 0/4 and the predefined sub-frame is a fifth sub-frame, if both the frame structures of the current frame and the next frame indicated by the DCI 0/4 are 0, then with regard to the HARQ timing of each data sub-frame between the predefined sub-frame of the current frame and the predefined sub-frame of the next frame, selecting, by the eNB and/or the UE, the HARQ timing of a corresponding data sub-frame in the frame structure 0; if at least one of the frame structures of the current frame and the next frame indicated by the DCI 0/4 are not 0, then with regard to the HARQ timing of each data sub-frame between the predefined sub-frame of the current frame and the predefined sub-frame of the next frame, selecting, by the eNB and/or the UE, the HARQ timing of the corresponding data sub-frame in a frame structure 6.

6. The method according to claim 5, further comprising: after the UE reads frame structure configuration information from Reuse Uplink Index (ULI) or Downlink Assignment Index (DAI) bit information in the DCI 0/4 of the predefined sub-frame, not sending the HARQ feedback in a corresponding Physical Uplink Shared Channel (PUSCH).

7. The method according to claim 1, wherein the step of selecting the corresponding HARQ timing for each data sub-frame between the predefined sub-frame of the current frame and the predefined sub-frame of the next frame comprises:
when the DCI indicating the frame structure is DCI 0/4 and the predefined sub-frame is an eighth sub-frame, with regard to the HARQ timing of each data sub-frame between the predefined sub-frame of the current frame and the predefined sub-frame of the next frame, selecting, by the eNB and/or the UE, the HARQ timing of a corresponding data sub-frame in a frame structure 3.

8. The method according to claim 1, wherein the predefined sub-frame employs the DCI of a Semi-Persistent Scheduling-Cell Radio Network Temporary Identifier (SPS C-RNTI) to indicate the frame structure of the next frame.

9. The method according to claim 8, wherein the DCI of the SPS C-RNTI is used to indicating, one time, the frame structure of the next frame.

10. The method according to claim 8, wherein the DCI of the SPS C-RNTI is used to indicating, semi-statically, the frame structure of the next frame.

11. A device for Hybrid Automatic Repeat Request (HARQ) of a dynamic frame structure, comprising:
a memory storing instructions; and
a hardware processor coupled to the memory executing the instructions to implement a dynamic frame structure determining module, a selecting module, and an executing module; wherein
the dynamic frame structure determining module is configured to notify the selecting module after determining that a predefined sub-frame of a current frame contains Downlink Control Information (DCI) indicating a frame structure;
the selecting module is configured to select, in all Time Division Duplexing (TDD) LTE frame structures, a corresponding HARQ timing for each data sub-frame between the predefined sub-frame of the current frame and the predefined sub-frame of a next frame; and
the executing module is configured to receive or send a HARQ feedback according to the HARQ timing selected by the selecting module;
wherein when this device is located in an evolved Node B (eNB), the dynamic frame structure determining module is configured to notify the selecting module after the predefined sub-frame of the current frame sends the DCI indicating the frame structure;

the selecting module is configured to, when sending data in a downlink data sub-frame between the predefined sub-frame of the current frame and the predefined sub-frame of the next frame, search, in a TDD LTE frame structure table, downlink data sub-frames having the same number as that of the downlink data sub-frame sending the data from all frame structures, select, in the searched downlink data sub-frames, the downlink data sub-frame having a maximum control channel resolution of a HARQ timing, take the HARQ timing of the frame structure in which the selected downlink data sub-frame is located as the HARQ timing of the downlink data sub-frame currently sending the data;
when receiving data in an uplink data sub-frame between the predefine sub-frame of the current frame and the predefine sub-frame of the next frame, search, in the TDD LTE frame structure table, uplink data sub-frames having the same number as that of the uplink data sub-frame receiving the data from all frame structures, select, in the searched uplink data sub-frames, the uplink data sub-frame having the maximum control channel resolution of the HARQ timing, take the HARQ timing of the frame structure in which the selected uplink data sub-frame is located as the HARQ timing of the uplink data sub-frame currently receiving the data.

12. The device according to claim 11, wherein when this device is located in a User Equipment (UE), the dynamic frame structure determining module is configured to notify the selecting module after the predefined sub-frame of the current frame detects the DCI indicating the frame structure;
the selecting module is configured to, when sending data in the uplink data sub-frame between the predefined sub-frame of the current frame and the predefined sub-frame of the next frame, search, in the TDD LTE frame structure table, uplink data sub-frames having the same number as that of the uplink data sub-frame sending the data from all the frame structures, select, in the searched uplink data sub-frames, the uplink data sub-frame having the maximum control channel resolution of the HARQ timing, and take the HARQ timing of the frame structure in which the selected uplink data sub-frame is located as the HARQ timing of the uplink data sub-frame currently sending the data; or
when a downlink data sub-frame between the predefine sub-frame of the current frame and the predefine sub-frame of the next frame receives the data, search, in the TDD LTE frame structure table, downlink data sub-frames having the same number as that of the downlink data sub-frame receiving the data from all the frame structures, select, in the searched downlink data sub-frames, the downlink data sub-frame having the maximum control channel resolution of the HARQ timing, and take the HARQ timing of the frame structure in which the selected downlink data sub-frame is located as the HARQ timing of the downlink data sub-frame currently receiving the data.

* * * * *